United States Patent [19]
Tame et al.

[11] Patent Number: 5,342,103
[45] Date of Patent: Aug. 30, 1994

[54] STRIKER BAR ASSEMBLY

[75] Inventors: Omar Tame, West Bloomfield, Mich.; John Franks, Rockford, Ill.

[73] Assignee: Modern Metal Products, Inc., Rockford, Ill.

[21] Appl. No.: 50,795

[22] Filed: Apr. 22, 1993

[51] Int. Cl.5 .............................. E05B 15/02
[52] U.S. Cl. ................... 292/341.17; 292/246
[58] Field of Search .............. 292/341.17, 113, 78, 292/79, 246, DIG. 44, DIG. 61; 287/378.13

[56] References Cited

U.S. PATENT DOCUMENTS

| | | | |
|---|---|---|---|
| 936,214 | 10/1909 | Bowes | 292/78 |
| 2,741,505 | 4/1956 | Courney | 292/341.17 |
| 2,893,775 | 7/1959 | George | 292/341.17 |
| 3,338,612 | 8/1967 | Howard | 292/DIG. 44 X |
| 3,572,066 | 3/1971 | Peters | 292/341.17 X |
| 4,225,166 | 9/1980 | Tanaka et al. | 292/341.17 |
| 4,669,764 | 6/1987 | Bruck | 292/341.17 X |
| 4,988,134 | 1/1991 | Vidwans et al. | 292/198 |

Primary Examiner—Rodney M. Lindsey
Attorney, Agent, or Firm—Harness, Dickey & Pierce

[57] ABSTRACT

A striker bar assembly including a resiliently biased striker bar. The striker bar is supported by a mounting bracket and resilient biased to permit a limited degree of rotation. The resilient biasing of the striker bar allows the striker bar to deflect when inadvertently struck by a foreign object and, if misalignment has occurred between the striker bar and the latch during mounting, allows the striker bar to deflect self-align and permit engagement.

19 Claims, 4 Drawing Sheets

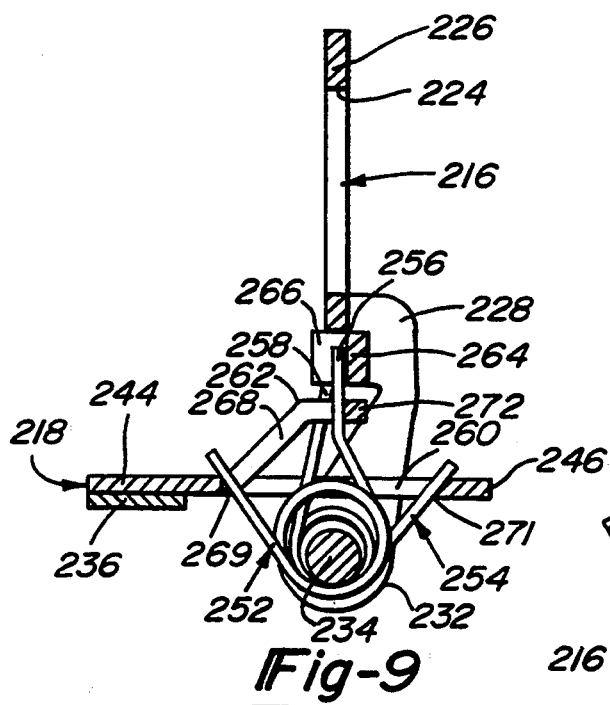
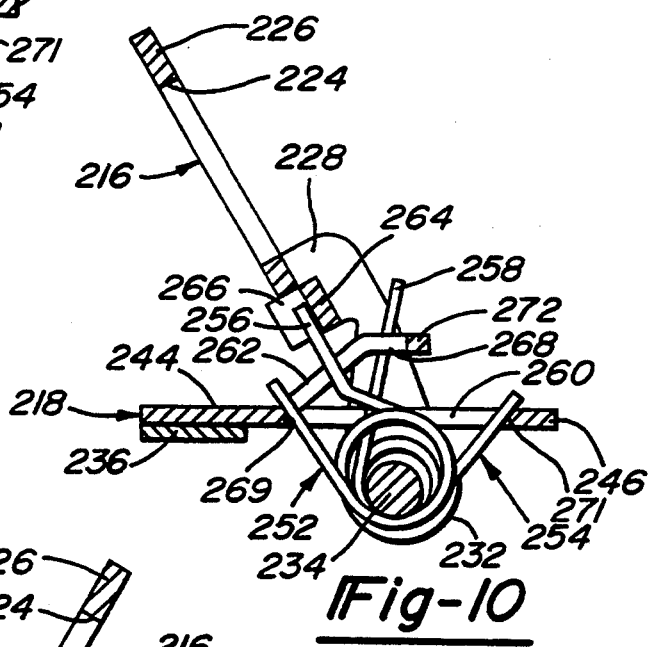
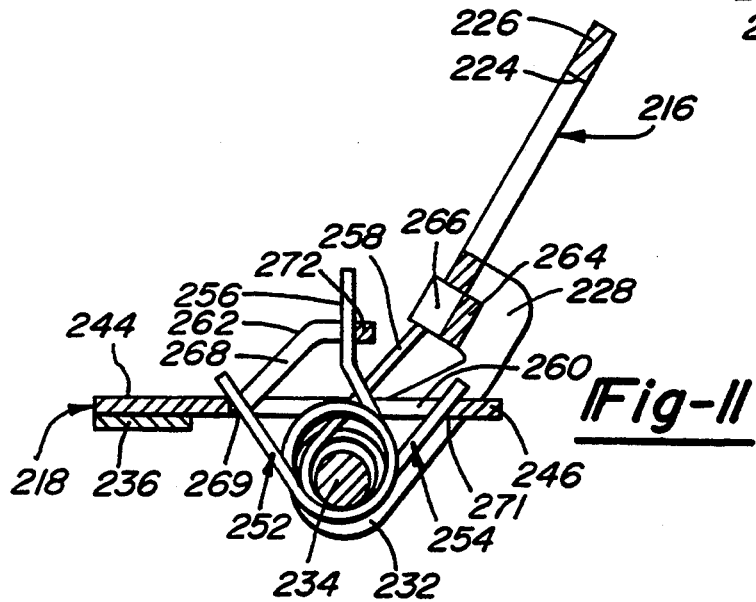

STRIKER BAR ASSEMBLY

BACKGROUND AND SUMMARY OF THE INVENTION

This invention generally relates to a latch assemblies. More particularly, the present invention is directed to a striker bar assembly as might be used with a latch to prevent the inadvertent forward folding of a motor vehicle seat back during sudden deceleration. The assembly includes a resiliently biased striker bar that assures proper alignment with the latch and permits deflection of the striker bar if inadvertently struck by another object.

As a safety feature, motor vehicle seat backs, which have forward folding capabilities, are often provided with an assembly that prevents the forwarding folding of the seat back when the vehicle is exposed to significant or sudden deceleration forces. These forces may occur, for example, during a frontal impact with another vehicle or during severe braking. In some vehicles, the rear seat back can be folded forward to provide access to a rear cargo space or to increased the load carrying area of the cargo space itself. In two door vehicles, the front seat backs can generally be folded forward to enhance rear seat ingress and egress.

Two broad types of assemblies are used for the above varieties of folding seats. Manual release assemblies require the operator to specifically actuate a spring biased latch lever before the seat can be folded forward. To increase operator convenience, most motor vehicle manufacturers now also provide inertia sensitive assemblies. The inertial assemblies typically permit the seat back to be freely folded forward. However, during vehicle deceleration above a pre-set level, the inertial assembly locks and prevents forward folding of the seat back.

These assemblies typically employ two individual mechanisms for securing the two separate bodies (the seat back and the support structure) together. The first of these mechanisms is a latch, either a manual or inertial release variety, and the second is a striker bar assembly.

The latch, mounted to the first body, releasably engages the striker bar assembly, mounted to the second body, thereby securing the two bodies together. In mounting the latch and the striker bar assemblies to their respective bodies, care must be taken to ensure that the hook portion of the latch is properly aligned with the cross member of the striker bar assembly. Failure to properly align the striker bar assembly and the latch can prevent engagement of the assembly. Since the latch and striker bar assembly are each mounted to support brackets of their respective bodies, which are in turn mounted to additional support structures, tolerance stackups often result in misalignment. If the misalignment is somewhat minor, it may only impact the smoothness of the assembly's operation. If the misalignment is severe, operation of the latch assembly may be completely impaired.

Previously, to correct misalignment, the striker bar assembly and/or the latch had to be removed and repositioned relative to each other. Obviously, the initial mounting of the latching, the inspection of the alignment between the latch and the striker bar assembly, and the realigning of the latch (or the striker bar assembly) are labor intensive operations that increase both production time and production cost.

Once properly mounted and aligned, if either of the mechanisms is inadvertently struck by a foreign object, misalignment may result. The mechanisms would then again need to be realigned.

With the above limitations in mind, it is a principal object of the present invention to provide an assembly that is operable when misaligned and requires no repositioning once it has been mounted. To this end, the present invention overcomes the problems of tolerance stack-up and allows the assembly to operate during both minor and relatively severe misalignment. Furthermore, the present invention allows for the striker bar assembly to deflect when struck by a foreign object and prevent misalignment for happening.

In achieving the above and other objects, the present invention provides an assembly in which the striker bar assembly is constructed in a manner which enables a cross member of the striker bar to self-align and positively locate itself relative to the latch lever of the latch and to deflect when struck by a foreign object. Three embodiments of the present invention are disclosed herein.

In the first embodiment, the striker bar includes the cross member and a cantilevered support member. The cantilever support member allows the cross member deflect upon contact with an engagement ramp of the latch. In response to this contact, deflection in a direction and an amount necessary to align the cross member with the hook of the latch's latch lever will occur.

The striker bar of the second embodiment includes a striker plate that defines the cross member. The striker plate is pivotally biased by a pair of tension springs. When misaligned, the striker plate will deflect, against the influence of the springs, when contacted by the engagement ramp of the latch into a position properly aligned relative to the hook of the latch's latch lever.

In a third embodiment of the present invention, a pivotally mounted striker plate is positioned by opposingly oriented torsion springs. The springs assure that the striker plate (and the cross member) is biased into a central or "dead center" position. A positive stop is utilized to ensure "dead center" positioning of the striker plate after deflection has occurred.

While the embodiments of the present invention are particularly suited for use in motor vehicles to restrict forward folding of seat backs, it is believed that the present invention has wider utility. For example, the present invention could readily be applied to vehicle doors, hoods and trunk lids, in addition to various non-motor vehicle latching applications. As will be seen from the discussion which follows, the present invention will find use in any latching situation where it is desirable to eliminate the need for precise mounting of the striker bar in relation to the latch or to permit the latch to recover from being inadvertently struck by a foreign object.

Additional benefits and advantages of the present invention will become apparent to those skilled in the art to which this invention relates from the subsequent description of the preferred embodiment and the appended claims, taken in conjunction with the accompanying drawings.

BRIEF DESCRIPTION OF THE DRAWINGS

FIG. 9 is a sectional view taken substantially along line 9—9 in FIG. 8 showing the striker bar in its "dead center" position;

FIG. 10 is a section view, similar to that seen in FIG. 9, showing the striker bar deflected against the force of one of the springs; and FIG. 11 is a sectional view, similar to that seen in FIGS. 9 and 10, showing the striker bar deflected against the force of the other spring.

DETAILED DESCRIPTION OF THE PREFERRED EMBODIMENT

Figure 1:
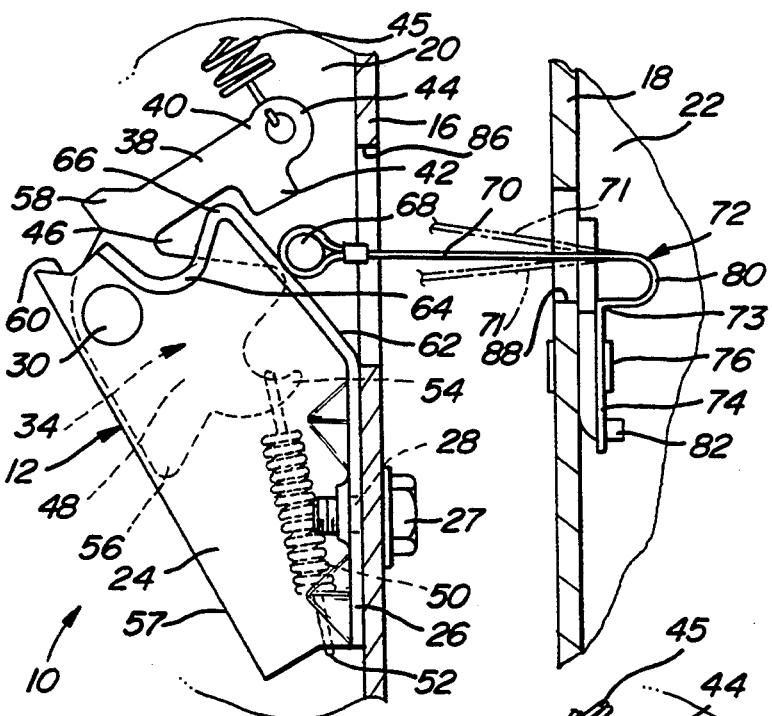
FIG. 1 is a sectional view of an assembly according to the principles of the present invention showing a latch and striker bar in misaligned positions relative to one another.

Referring now to FIG. 1, one embodiment of a latch assembly 10 incorporating the principles of the present invention. The latch assembly 10 includes two principal components, a latching mechanism or latch 12 and a striker bar assembly (hereinafter striker bar) 14. The latch 12 and striker bar 14 are each respectively mounted to mounting brackets 16 and 18 of first and second bodies 20 and 22. The first and second bodies 20 and 22 may respectively be a seat back and corresponding seat back support structure, such as a rear shelf. Alternatively, the first and second bodies 20 and 22 could be any two structures which require latching together.

As will become apparent from the discussion set out below, the present invention will have utility with both spring biased and inertial latches 12. For the sake of clarity, however, only a spring biased latch 12 is shown in the figures and discussed in conjunction with the embodiments.

Figure 2:
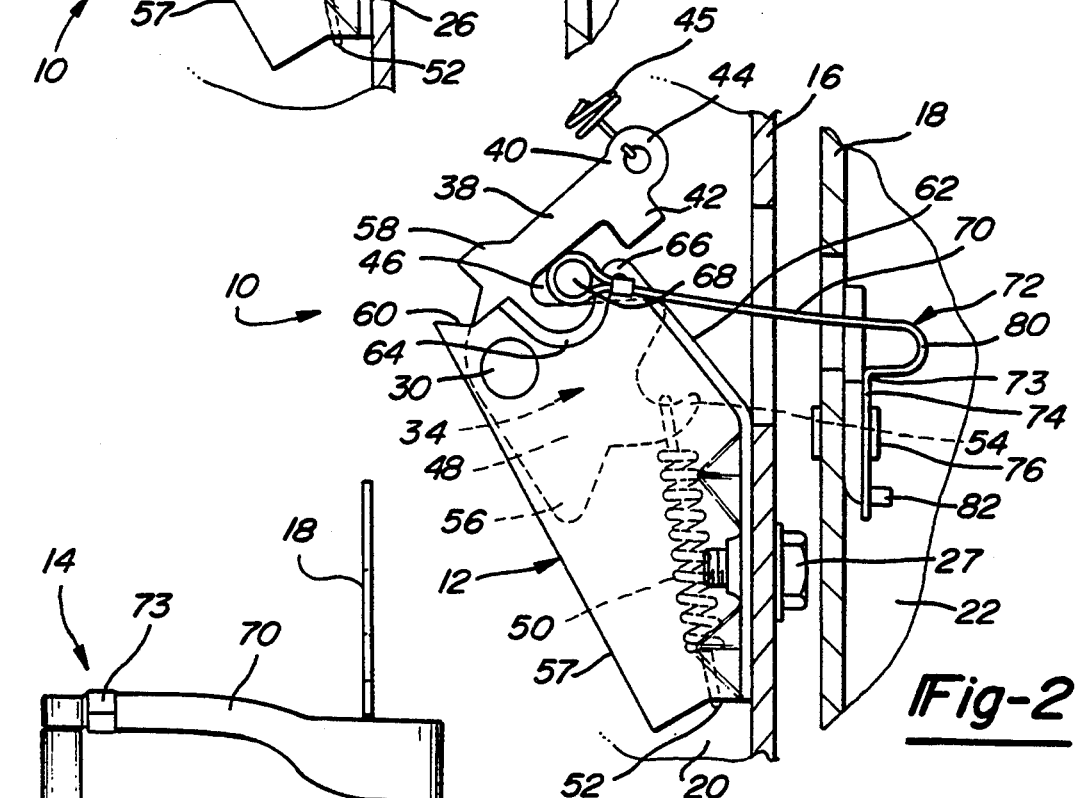
FIG. 2 is a sectional view similar to that of FIG. 1 showing the striker bar deflected into engagement with the latch.

As seen in FIGS. 1 and 2, the latch 12 generally includes a housing 24, a latch lever 34 and a mounting plate 26. Mounting bores 28 are defined through the mounting plate 26 for attaching the latch 12 to the mounting bracket 16 by screws or other fasteners 27. The latch lever 34 is carried for rotation by a pivot post 30 which is extended through the housing 24 and a pivot bore defined in the latch lever 34. The pivot post 32 is carried by the housing 24 at a position which enables the latch lever 34 to cooperate with various additional structures of the housing 24 so as to engage and retain the striker bar 14 therewith.

To retain the striker bar 14, the latch lever 34 is formed with a hook 38 that terminates at its distal end 40 in a transversely extending tooth 42. A notch 46, into which the striker bar 14 is received, as further described below, is defined in the latch lever 34 between the hook 38 and a main body 48. Also formed on the distal end 40 of the hook 38 is a release 44, the purpose of which is also set out below.

In order to bias the latch lever 34 of the latch 12 into its closed position as shown in FIG. 1, a return spring 50 is connected between a spring attachment notch 52, formed in the housing 24, and a spring attachment finger 54, formed on the latch lever 34. The main body 48 of the latch lever 34 also includes a stop boss 56. The stop boss 56 is positioned to interferingly engage a rear wall 57 of the housing 24 thereby limiting rotation of the latch lever 34, under the influence of the spring 50, past its closed position.

With the latch lever 34 biased in its closed position, a surface of the housing 24, generally facing the striker bar 14, defines an engagement ramp 62. The engagement ramp 62 extends in a direction toward and terminates in an end adjacent to the tooth 42. At the end of the engagement ramp 62, adjacent to the tooth 42, the housing 24 also includes portions which define a cradle 64 and lip 66. The cradle 64 and the lip 66 cooperate with the hook 38 (in particular the notch 46 and tooth 42) and return spring 50 of the latch 12 to retain the striker bar 14 in an engaged position with the latch 12.

Three embodiments of a striker bar are presented herein. The first embodiment is illustrated in FIGS. 1—3, the second embodiment is detailed in FIGS. 4—6, and the third is shown in FIGS. 7—11.

Figure 3:
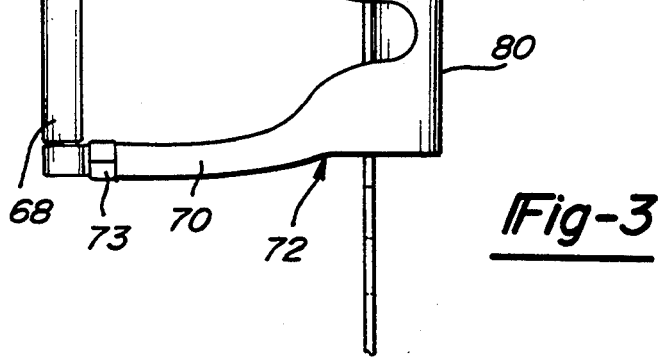
FIG. 3 is a plan view of the striker bar shown in FIGS. 1 and 2.

Referring now to the striker bar 14 depicted in FIGS. 1—3, the striker bar 14 includes a cross bar or member 68 supported between a pair of spaced apart arms 70. The arms 70 are themselves formed in the freely movable end of a cantilevered striker plate 72. The striker plate 72 is relatively thin and is resilient. The fixed end of the striker plate 72 forms a mounting plate 74 which is rigidly secured to the mounting bracket 18 of the second body 22. Conventional methods, including the use of a fastener 76, such as a screw, bolt or rivet, are used to secure the mounting plate 74 to the mounting bracket 18. To facilitate fastening, a mounting bore is defined through the mounting plate 74.

While alternative angular orientations can be used, the striker bar 14 of the first embodiment is formed so that its fixed and free ends are oriented approximately ninety degrees (90°) apart from one another. This orientation is achieved by providing the striker plate 72 with a return bent portion 80.

The return bent portion 80 provides for increased deflectability at the free end of the striker plate 72. As best seen in FIGS. 1 and 2, the striker plate 72 includes a first bend 73, approximating ninety degrees (90°), which directs the striker plate 72 in a direction away from the latch 12. The return bent portion 80 is then bent approximately one hundred and eighty degrees (180°) so as return back along itself (hence the name return bent) and extend toward the latch 12.

Where it extends toward the latch 12, the striker plate 72 diverges into the arms 70 which support the cross member 68. The ends of the arms 70 are provided with outwardly or transversely extending tabs 73. To secure the cross member 68 to the striker plate 72, the ends of the arms 70 are bent around the ends of the cross member 68 and back onto themselves. The tabs 73 are bent around the sides of the legs 70 thereby securing the cross member 68.

In order to prevent further misalignment of the cross bar 68 and the latch 12, the mounting portion 74 and the mounting bracket 18 interact so as to prevent relative rotation therebetween. To prevent rotation, the end of the mounting portion 74 is provided with a recess which defines the fixed end of the striker plate 72 into two tabs. A flange 82 formed on the mounting bracket 18 is bent to extend between the tabs, into the recess, and interfere with relative rotation.

Depending on the particular application, access apertures 86 and 88 may be formed in the mounting brackets 16 and 18. These apertures 86 and 88 allow the latch 12 and the striker bar 14 to be housed within the bodies 20 and 22 while still being engageable with one another.

As stated above, because of tolerance stackups during the mounting of the latch 12 and striker bar 14 to their respective mounting brackets 16 and 18, and the further because of tolerances in the mounting of the first and second bodies 20 and 22 to the motor vehicle, the cross member 68 may be disaligned with the latch 12 thereby preventing engagement with the hook 38 when the bodies 20 and 22 are moved into a closed or latched position. The self-aligning capabilities the present invention, however, prevent any misalignment from inhibiting the operability of the latch assembly 10.

When misaligned, movement of the bodies into their latched positions causes the cross bar 68 to contact the engagement ramp 62. This contact deflects the legs 70 of the striker plate 72, as designated in phantom at 71, thereby moving the cross member 68 into alignment and engagement with the tooth 42. Continued movement of the bodies 20 and 22 (and the latch 12 and striker bar 14) toward each other causes the cross member 68 to push on the tooth 42. In response to the pushing of the cross member 68, the latch lever 34 rotates about the pivot post 30, against the force of the spring 50, to a point where a gap is created between the lip 66 of the housing 24 and the tooth 42. When the gap becomes large enough, the cross member 68 will pass through the gap and into the notch 46. In the notch 46, the cross member 68 is biased by the hook 38, under the influence of the spring 50, into engagement with the cradle 64. The lip 66 of the housing 24, the tooth 42 of the latch lever 34, and the spring 50 all cooperate to prevent inadvertent disengagement of the striker bar 14 from the latch 12.

When it is desired to disengage the striker bar 14 from the latch assembly 12, a strap, push-button or pull cable 45, coupled to a release 44, is actuated rotating the latch lever 34 into its open position. During release of the latch assembly 10, a stop shoulder 58 of the latch lever 34 engages a stop surface 60 of the housing 24 preventing over rotation of the latch lever 34 and undo stretching of the spring 50.

Figure 4:
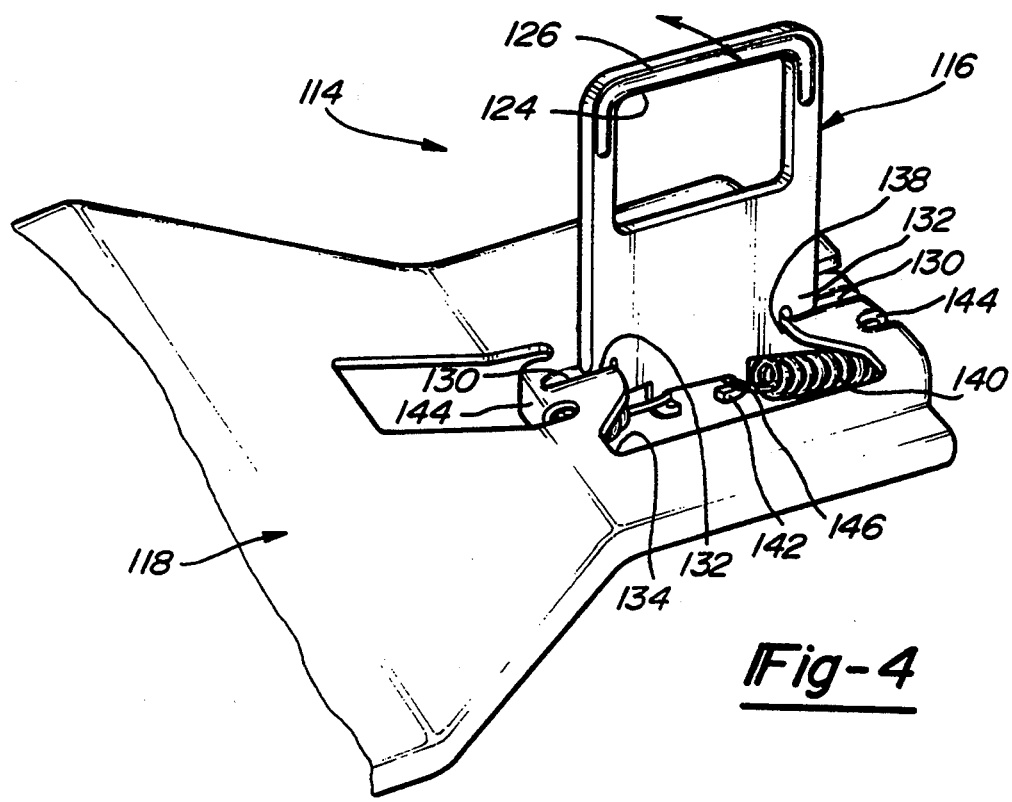
FIG. 4 is a perspective view of a second embodiment of the present invention.
Figure 5:
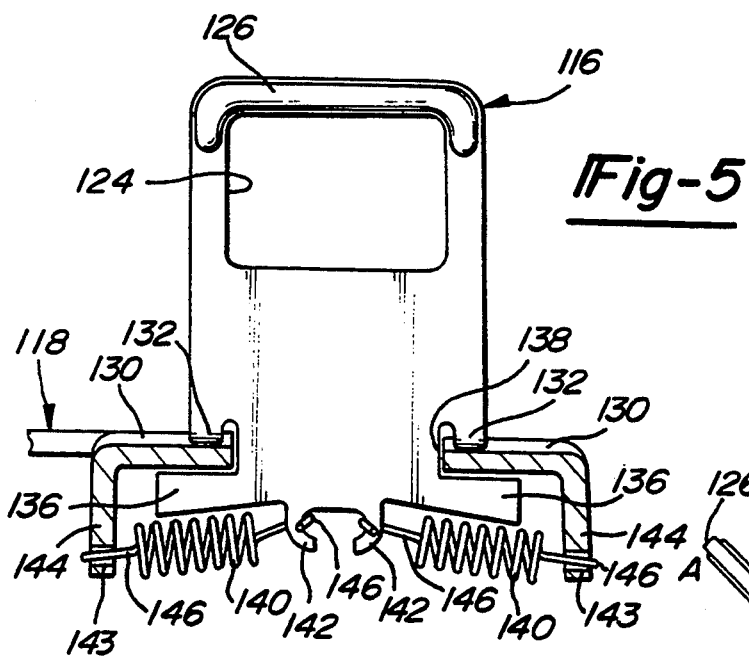
FIG. 5 is a sectional view taken substantially along line 5—5 in FIG. 4 illustrating the mounting of the striker plate to the mounting bracket.
Figure 6:
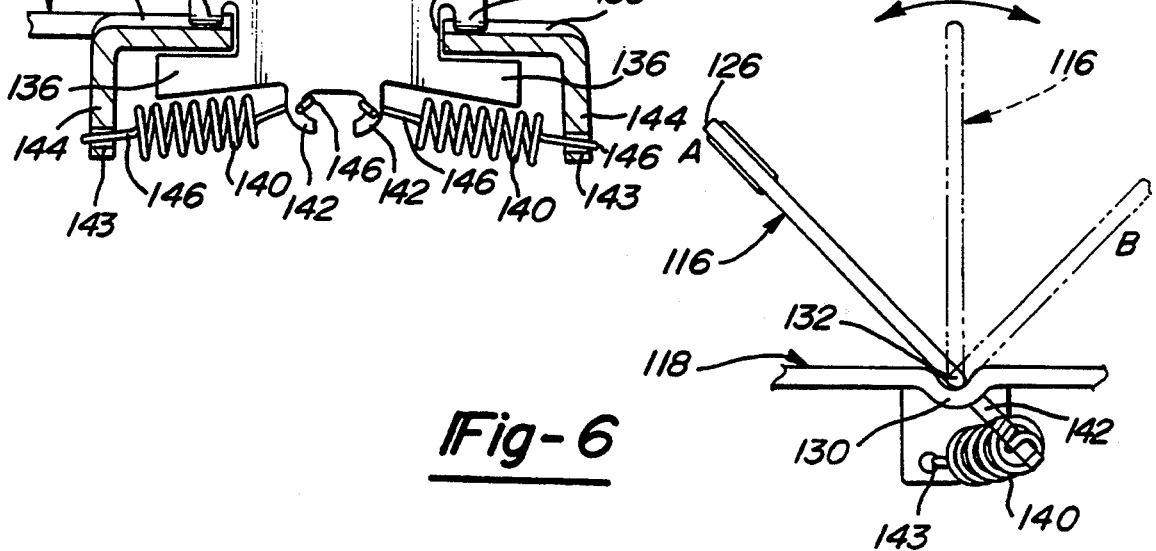
FIG. 6 is a side elevational view illustrating the deflected extreme positions of the striker plate shown in FIG. 5.
Figure 7:
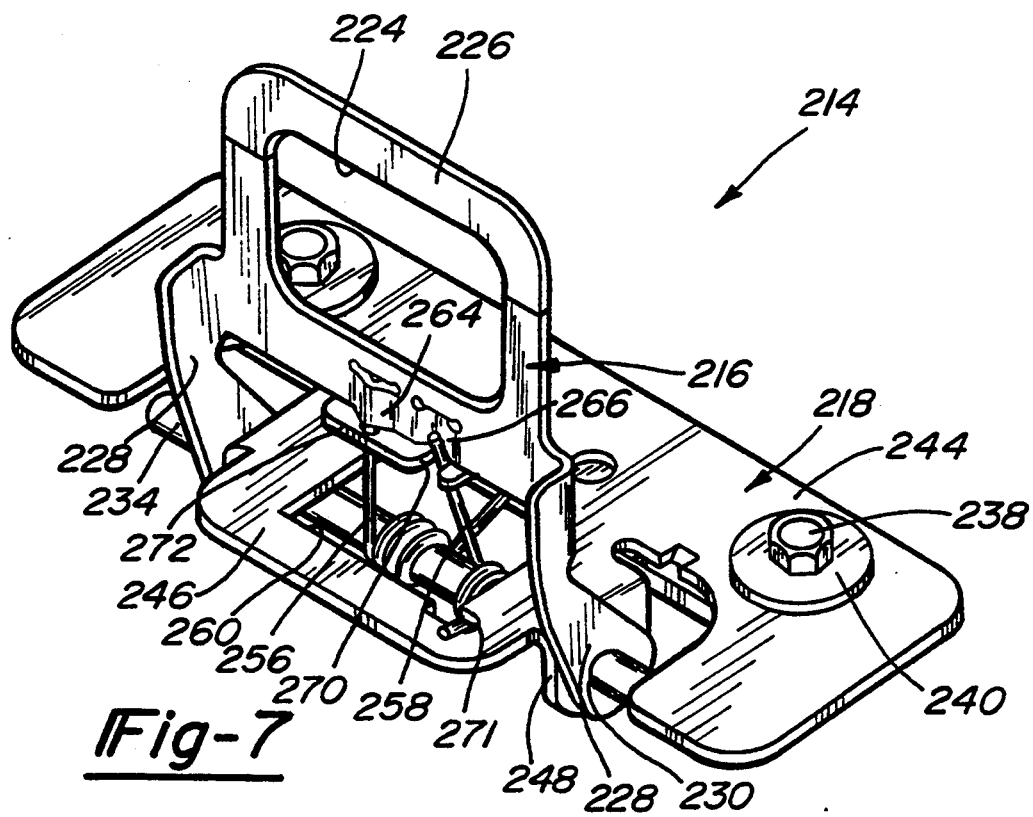
FIG. 7 is a perspective view of a third embodiment of the present invention.

The second embodiment of the striker bar is illustrated in FIGS. 4–6 and is generally designed by numeral 114. The striker bar 114 is has an enhanced structural construction as might be found in the latch assembly associated with a vehicle hood or trunk lid. Operating in a manner generally similar to the first embodiment, the striker bar 114 of this embodiment is capable of compensating for tolerance stackups by aligning itself with the latch 12. While a specific latch construction is not shown in conjunction with the second embodiment, it should be understood that the striker bar 114 can be used with the variety of latches generally and specifically discussed above.

The striker bar 114 of the second embodiment includes a striker plate 116 which is pivotally supported on a mounting plate 118. The striker plate 116 includes an aperture 124 which further defines a cross member 126 in the end of the striker plate 116 which is away from the mounting plate 118. To support the striker plate 116 on the mounting plate 118, recessed grooves 130 are formed in the mounting plate 118. The grooves 130 receive shoulders 132 cut into the end of the striker plate 116 adjacent to the mounting plate.

As best seen in FIGS. 4 and 5, a portion of the striker plate 116 extends through and beneath the mounting plate 118. To allow for this positioning of the striker plate 116, a generally bell-shaped aperture 134 is defined in the mounting bracket 118. The grooves 130 mentioned above extend generally transversely from the sides of the aperture 134.

Tabs 136, the purpose of which is more fully discussed below, are formed in opposite sides of the striker plate 116 with recesses 138 defined between the tabs 136 and the shoulders 132. The recesses 138 receive the grooves 130 of the mounting plate 118. The tabs 136, positioned beneath the grooves 130, thus prevent the striker plate 116 from being withdrawn directly upward out of engagement with the mounting plate 118.

To position the striker plate 116 on the mounting plate 118, the striker plate 116 is inserted through the bell-shaped aperture 134, generally diagonally with respect to the aperture 134, and rotated approximately forty-five degrees (45°) until the grooves 130 are positioned within the recesses 138 and the shoulders 132 rest within the grooves 130.

Tensions springs 140 are used to pivotally bias and positively retain the striker plate 116 on the mounting plate 118. The springs 140, two of which are used in the illustrated embodiment, extend between curved fingers 142 formed in the striker plate 116 and down turned flanges 144 formed in the mounting plate 118. Notches 143 are formed adjacent to the ends of the flanges 144 to securely engage and retain one of the hooked ends 146 of the springs 140. The flanges 144 also extend a distance beyond the fingers 142 of the striker plate 116. In the illustrated embodiment of FIG. 5, this is below the fingers 142 of the striker plate 116. This extension of the flanges 144 below the fingers 142 of the striker plate 114 allows the springs 140 to exert a downward pulling force on the striker plate 114 ensuring that the shoulders 132 are maintained in engagement with the grooves 130 during operation of the latch assembly.

By mounting of the striker plate 116 to the mounting plate 118 as described above, when misalignment occurs, the striker plate 116 can deflect over a range of positions until it becomes aligned with the latch 12 and is engaged thereby. The maximum positions of deflection for the striker plate 116 are designated at positions A and B. Since the striker bar 114 cooperates with the latch 12 in a manner which is generally similar to that discussed in connection with the first embodiment, the engagement and disengagement of the striker bar 114 and the latch 12 is not being discussed in detail. In this regard, reference should be made to the earlier discussion.

The tabs 136 also prevent over deflection or pivoting of the striker plate 116 by engaging the lower surface of the mounting plate 118 in an area adjacent to the grooves 130. Simultaneous to the contacting of the tabs 136 adjacent to the grooves 130, the shoulders 132 contact the upper surface of the mounting plate 118, also adjacent to the grooves 130.

Referring now to FIGS. 7–11, the third embodiment of the present invention will be discussed. The third embodiment includes a striker bar 214 having features which assure that the striker plate 216 is biased back into its central or "dead center" position after deflection. As used herein, "dead center" positioning is intended to mean that the striker plate will repeatedly return to an initial or predetermined position, within acceptable tolerances (typically +/−1° degree), after being deflected by a foreign object or released from engagement with a latch 12.

The striker plate 216, mentioned above, is pivotally mounted to a mounting plate or bracket 218 so as to permit a limited degree of rotation. The striker plate 216 includes an aperture 224 which defines a cross member 226 at one end of the striker plate 216. When mounted to the mounting plate 218, the cross member 226 is located in a position away from the mounting plate 218.

The striker plate 216 is formed from plate stock which is stamped, cut or otherwise formed into the desired configuration. In addition to the cross member 226, two mounting legs 228 are formed in the end of the striker plate 216 opposite the cross member 226. The mounting legs 228 initially form transverse extensions from the remainder of the striker plate 216 and each include apertures 230 in their lower ends 232. To enable mounting of the striker plate 216 to the mounting plate 218, as further described below, the mounting legs 228 are bent approximately 90° relative to the remainder of the striker plate 216. In bending the mounting legs 228, the apertures 230 become aligned with one another to receive a pivot rod 234 as further discussed below.

The mounting plate 218 is used to secure the striker bar 214 to an appropriate support structure or body as mentioned above. To ease construction, a tapping plate 236, having threaded bores therein, is welded to the support structure for the striker bar 214. Bolts or other fasteners 238, used with or without washers 240, are inserted through openings 242 in the body 244 of the mounting plate 218 and into the bore of the tapping plate 236.

A tongue 246 extends transversely from the center of the body 244 of the mounting plate 244. The tongue 246 includes downwardly turned support flanges 248 which are oppositely positioned from one another. The support flanges 248 generally correspond with the mounting legs 228 of the striker plate 216 and, like the mounting legs 228, include apertures 250 for receiving the pivot rod 234. The coiled centers of two torsion springs, designated at 252 and 254, are positioned on the pivot rod 234 so as to captured them between the two support flanges 248 and the two mounting legs 248.

Active legs 256 and 258 of the springs 252 and 254, respectively, extend upward from the pivot rod 234 and pass through a central opening 260 defined in the tongue 246. The central opening 260 is formed by a flange (hereinafter stop flange) 262 bent upward from the tongue 246. The active legs 256 and 258 respectively pass through slots 268 and 270 in the stop flange 262 before engaging a pair of oppositely oriented grooves 264 and 266 formed in the striker plate 218, generally opposite of the cross member 226 and between the mounting legs 228.

The springs 252 and 254 are each provided on the pivot rod 234 so as to exert a spring force bias the striker plate 216 in opposite directions from one another. For reasons which will become more apparent from the discussion that follows, one spring 252 exhibits a greater spring force than the other spring 254. The difference between the spring forces need not be substantial and the actual spring forces will depend on the particular application of the latch assembly 12. For use with automotive seat backs, it has been found that a spring force of one and three quarter pounds for the larger spring 252 and a spring force of one and one quarter pounds for the smaller spring 254 is sufficient.

Figure 8:
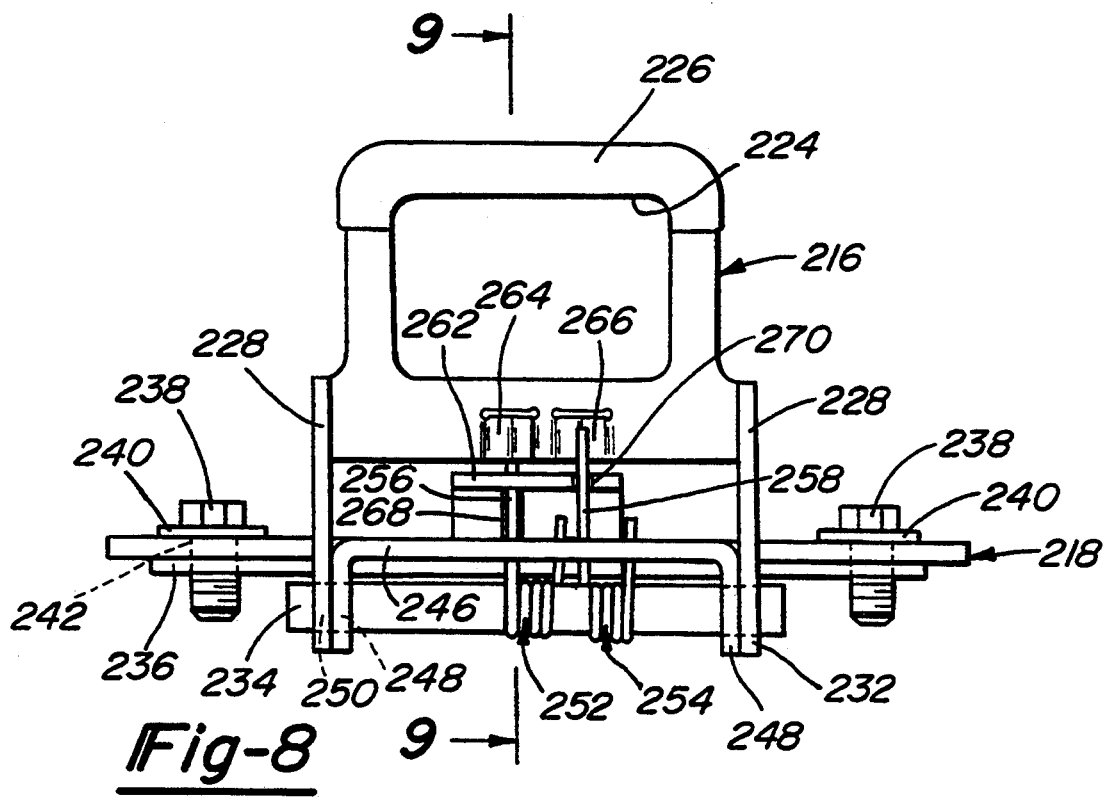
FIG. 8 is a front elevational view of the embodiment seen in FIG. 7.

The springs 252 and 254 cooperate with each other and the stop flange 262 so as to repeatedly bias the striker plate 216 back into its "dead center" position after being deflected. Deflection of the striker plate 216 can occur during self-aligning with a latch 212 or when forced to move by contact with another article. As seen in FIG. 8, spring 252 is mounted on the pivot rod 234 and has one leg engaged in a notch 269 in the mounting plate 218 and the other or active leg engaged with the striker plate 216 so as to tend to bias the striker plate 216 out of the page of the drawing. Conversely, spring 254 is mounted on the pivot rod 234 with one leg engaging a notch 271 in the mounting and its other, active leg 258, engaging the striker plate so as to bias the striker plate 216 into the page of the drawing.

If the striker plate 216 is defected generally toward the left in FIG. 10, it will be against the force of the larger spring 252 and the slot 268, defined in the stop flange 262, will permit the spring 252 to be compressed. At the same time, spring 254 is prevented from further opening as active leg 258 is limited in its travel by the end of its slot 270.

When the force causing deflection of the striker plate 216 is released, the spring 252 biases the striker plate 216 back toward its "dead center" position. The striker plate 216 is prevented from being biased by spring 252 beyond its dead center position (generally to the right in FIGS. 9, 10 and 11) by a positive stop 272, which defines one end of the slot 268, and the spring force of the other spring 254. The positive stop 272 is positioned to coincide with the "dead center" position of the striker plate 216 and thereby limits the degree of rotation through which the spring 252 can act upon the striker plate 216.

When the striker plate 216 is deflected against the spring force of spring 254, generally to the right in the Figures, the active leg 256 of larger spring 252 remains engaged with the positive stop 272. As the force deflecting the striker plate 216 is released, spring 254 will bias the striker plate 216 back toward its "dead center" position. The striker plate will not be biasing beyond the "dead center" position because it will again engage spring 252 and its greater spring force.

In this manner, after deflection, the springs 252 and 254 of the third embodiment assure that the striker plate 216 will be repeatedly biased to within acceptable tolerances of its "dead center" position. Obviously, this third embodiment will have particular utility when it mounted in an environment where it is susceptible to being deflected by foreign objects and external forces.

When mounted for use, the various embodiments of the striker plate assembly 14, 114 or 214 will compensate for misalignment and tolerance stackups because of their self-aligning characteristics. Thus, if the striker plates 14, 114 or 214 are misaligned relative to the latch 12, contact with the latch 12 will deflect the striker plates 14, 114 or 214 until the cross bars 38, 126 or 226 become properly aligned with the latch lever 34 allowing engagement to occur without necessitating repositioning of either the latch 12 or the striker bar 14, 114 or 214.

While the above description constitutes the preferred embodiments of the present invention, it will be appreciated that the invention is susceptible to modification, variation and change without departing from the proper scope and fair meaning of the accompanying claims.

What is claimed is:

1. A self-aligning striker bar assembly for use with a latch in latching first and second bodies together which are movable relative to one another between latched and unlatched positions, the latch being mounted to one of the bodies and having a guide surface and means for releasably engaging said striker bar assembly when in the latched position, said striker bar assembly comprising:

a mounting bracket including means for securing said striker bar assembly to the other of the bodies;

a striker plate including portions defining a cross bar, said cross bar adapted to coact with the engaging means of the latch to latch the first and second bodies together, said striker plate being movably connected to said mounting bracket to permit a limited degree of relative movement therebetween, said striker plate and cross bar being movable between extreme positions of deflection and having a generally central position therebetween; and means for biasing said striker plate substantially into said central position while permitting movement between said extreme positions of deflection, said biasing means including first and second spring members coacting between said mounting bracket and said striker plate, said first and second spring members acting in opposite senses to return said striker plate and said cross bar to said central position after being rotated therefrom.

2. A self-aligning striker bar assembly as set forth in claim 2 wherein said first spring member exerts a greater spring force on said striker plate than said second spring member.

3. A self-aligning striker bar assembly as set forth in claim 2 wherein said first and second spring members are torsion springs, said torsion spring engaging said striker plate and exerting spring forces in opposing directions thereagainst.

4. A self-aligning striker bar assembly as set forth in claim 2 further comprising a positive stop, said positive stop being associated with said first spring member and limiting the degree of said movement through which said first spring member exerts a spring force upon said striker plate.

5. A self-aligning striker bar assembly as set forth in claim 4 wherein said positive stop is formed on said mounting bracket, said positive stop corresponding with said central position of said cross bar, said positive stop cooperating with said first and second spring members to locate said cross bar in said central position under the influence of said first and second spring members.

6. A self-aligning striker bar assembly as set forth in claim 4 wherein said positive stop is defined by a portion of said mounting bracket.

7. A self-aligning striker bar assembly as set forth in claim 1 wherein said mounting bracket further includes means for supporting a pivot rod, said pivot rod defining an axis and said striker plate being mounted to said pivot rod for limited rotation about said axis.

8. A self-aligning striker bar assembly as set forth in claim 7 wherein said first and second spring members are torsion springs mounted on said pivot rod, said first and second spring members including a first leg engaging a portion of said striker plate and a second leg engaging a portion of said mounting plate.

9. A self-aligning striker bar assembly for use with a latch in latching first and second bodies together which are movable relative to one another between latched and unlatched positions, the latch being mounted to one of the bodies and having a guide surface and means for releasably engaging said striker bar assembly when in the latched position, said striker bar assembly comprising:

a mounting bracket including means for securing said striker bar assembly to the other of the bodies;

a striker plate including portions defining a cross bar, said cross bar adapted to coact with the engaging means of the latch to latch the first and second bodies together, said striker plate being movably connected to said mounting bracket to permit a limited degree of relative movement therebetween, said striker plate and cross bar being movable between extreme positions of deflection and having a generally central position therebetween;

biasing means for biasing said striker plate substantially into said central position while permitting movement between said extreme positions of deflection;

at least one support shoulder formed on said striker plate; and a portion defining a support surface on said mounting bracket, said support surface receiving said support shoulder in supporting contact therewith, said biasing means operating to retain said support shoulder in contact with said support surface of said mounting bracket while permitting said limited degree of movement, said striker plate being movable in response to contact between said cross bar and the guide surface during movement of the bodies from their unlatched positions into their latched position.

10. A self-aligning striker bar assembly as set forth in claim 9 wherein said mounting bracket includes portions defining an aperture, said striker plate having first and second ends and being positioned with said first and second ends on opposite sides of said mounting bracket.

11. A self-aligning striker bar assembly as set forth in claim 10 wherein said biasing means includes at least one tension spring extended between said mounting bracket and said striker plate so as to exert a pulling force on said striker plate, said tension spring being positioned on a side of said mounting bracket opposite said cross bar.

12. A self-aligning striker bar mechanism as set forth in claim 9 wherein said striker plate includes at least one tab formed in said striker plate adjacent to said support shoulder, said tab interferingly engaging said mounting bracket during rotation to limit rotation of said striker plate.

13. A self-aligning striker bar mechanism as set forth in claim 12 wherein said tab and said support shoulder are positioned on opposite sides of said mounting bracket.

14. A self-aligning striker bar assembly for use with a latch in latching first and second bodies together which are movable relative to one another between latched and unlatched positions, the latch being mounted to one of the bodies and having a guide surface and means for releasably engaging said striker bar assembly when in the latched position, said striker bar assembly comprising:

a striker plate including portions defining a cross bar, said cross bar adapted to coact with the engaging means of the latch to latch the first and second bodies together;

a mounting bracket including means for securing said striker bar assembly to the other of the bodies and also including a support flange for supporting said striker plate thereon;

a pivot rod being carried by said support flange, said striker plate being rotatably mounted to said pivot rod for a limited degree of relative rotation between said striker bar and said mounting bracket, said striker plate and cross bar being rotatable between extreme positions of deflection and having a generally central position therebetween; and first and second spring members in contacting engagement with said striker plate and exerting spring forces in opposing directions thereagainst, said first spring member exerting a greater spring force on said striker plate than said second spring member and being associated with a positive stop formed by a portion of said mounting bracket to limit the degree of said rotation through which said first spring member exerts a spring force upon said striker plate, said positive stop corresponding with said central position of said cross bar and cooperating with said first and second spring members to locate said cross bar in said central position under the influence of said first and second spring members.

15. A self-aligning striker bar assembly for use with a latch in latching first and second bodies together which are movable relative to one another between latched and unlatched positions, the latch being mounted to one of the bodies and having a guide surface and means for releasably engaging said striker bar assembly when in the latched position, said striker bar assembly comprising:

a cantilevered member including a mounting bracket and a striker plate unitarily formed therewith, said mounting bracket generally being formed with said cantilevered member at one end thereof and including means for securing said striker bar assembly to the other of the bodies, said striker plate generally being formed with said cantilevered member at the other end thereof;

a cross bar support by said striker plate, said cross bar adapted to coact with the engaging means of the latch to latch the first and second bodies together, said striker plate being movably connected to said mounting bracket to permit a limited degree of relative movement therebetween, said striker plate and cross bar being movable between extreme positions of deflection and having a generally central position therebetween; and biasing means for biasing said striker plate substantially into said central position while permitting movement between said extreme positions of deflection.

16. A self-aligning striker bar assembly to be used with a latch for latching first and second bodies together, said bodies being movable relative to one another between latched and unlatched positions, the latch being mounted to one of said bodies and including means for releasably engaging said striker bar assembly, said striker bar assembly comprising:

a cantilever support member having a free end and a fixed end, said fixed end including means for fixedly mounting said cantilevered support member to the other of said bodies in a position generally corresponding to the latch, said free end being deflectable with respect to said fixed end; and a cross bar located at said free end of said cantilever support member and being supported for cantilevered movement with said free end, said cross bar and said free end being deflectable in response to contact with the latch during movement of said first and second bodies from an unlatched position into a latched position, said cross bar being movable into an aligned position with respect to the latch engaging means to thereby enable engagement of said cross bar and the engaging means when said first and second bodies are in the latched position.

17. A striker bar assembly as set forth in claim 16 wherein said fixed and free ends are located approximately ninety degrees (90°) apart from one another.

18. A striker bar assembly as set forth in claim 16 wherein said cantilevered support member is returnly bent upon itself at a location between said fixed and free ends.

19. A striker bar assembly as set forth in claim 1 further comprising anti-rotation means including a tab defined in said fixed end, said tab adapted to interferingly engage a portion of the other body and prevent rotation of said assembly about an axis transverse to said cross bar.

* * * * *